United States Patent [19]
Senbokuya

[11] Patent Number: 5,571,371
[45] Date of Patent: Nov. 5, 1996

[54] SHEET MATERIAL BUTT-JOINING APPARATUS

[75] Inventor: Takashi Senbokuya, Fussa, Japan

[73] Assignee: Bridgestone Corporation, Tokyo, Japan

[21] Appl. No.: 419,689

[22] Filed: Apr. 11, 1995

[30] Foreign Application Priority Data

Apr. 11, 1994 [JP] Japan .................................. 6-096882

[51] Int. Cl.$^6$ .................................................. B65H 69/06
[52] U.S. Cl. ...................... 156/502; 156/157; 156/304.1; 156/134; 156/507
[58] Field of Search ..................................... 156/134, 137, 156/157, 304.1, 502, 507

[56] References Cited

U.S. PATENT DOCUMENTS 2,487,149  11/1949  Leguillon .
3,130,100   4/1964  Hasselquist .
4,765,862   8/1988  Azuma .
5,403,429   4/1995  Minakawa et al. .

FOREIGN PATENT DOCUMENTS 1487807  10/1967  France .
2359131   6/1975  Germany .
55-14739   4/1980  Japan .
1042645   9/1966  United Kingdom .

OTHER PUBLICATIONS

Database WPI, Week 7747, Derwent Publications Ltd., London, GB, Abstract No. 77–84073.
Database WPI, Week 8439, Derwent Publications Ltd., London, GB, Abstract No. 84–241260.

Primary Examiner—Michael W. Ball
Assistant Examiner—Sam Chuan Yao
Attorney, Agent, or Firm—Sughrue, Mion, Zinn, Macpeak & Seas

[57] ABSTRACT

A sheet material butt-joining apparatus provides improved joining strength and accuracy between starting and finishing ends (S1, S2) of a sheet material S, by keeping the distance between these ends (S1, S2) of the sheet material (S) at a predetermined value by means of a control pin (63). A motor is continuously operated even after the starting and finishing ends (S3, S4) of the sheet material (S) are held by top and bottom joining pawls (48, 49, 36, 37). In this instance, a cam follower (95) moves in a slot (94) to temporarily stop transfer of a vertically moving force to a vertically movable base (26). On such occasion, the control pin (63) is lowered and retracted from an intermediate position between the starting and finishing ends (S1, S2) of the sheet material (S) to form a gap between these ends (S1, S2). The starting and finishing ends (S3, S4) held by the joining pawls are prevented from deformation or the like.

5 Claims, 9 Drawing Sheets

FIG_3
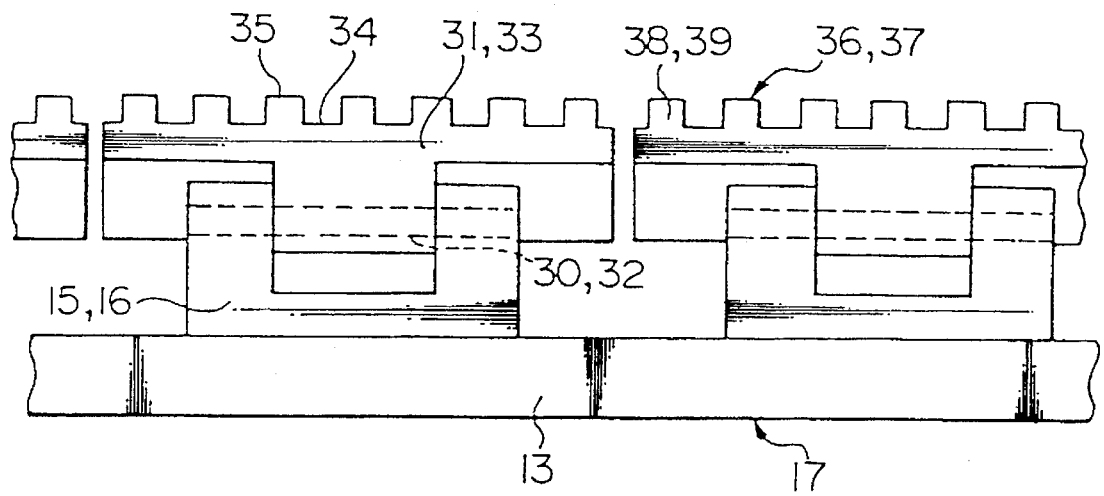
FIG_4
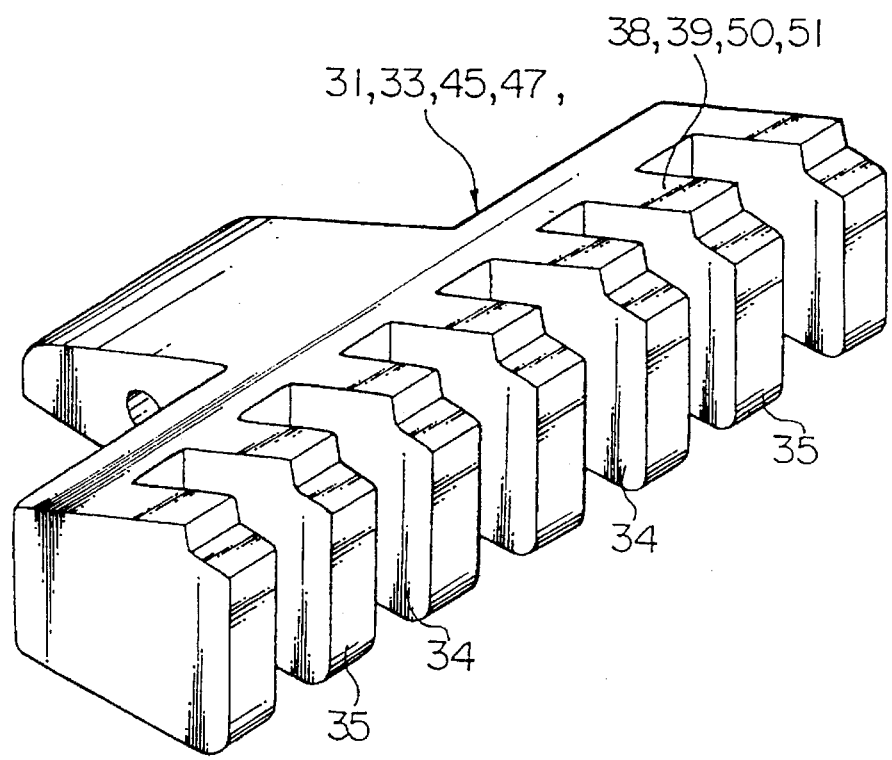

FIG_5
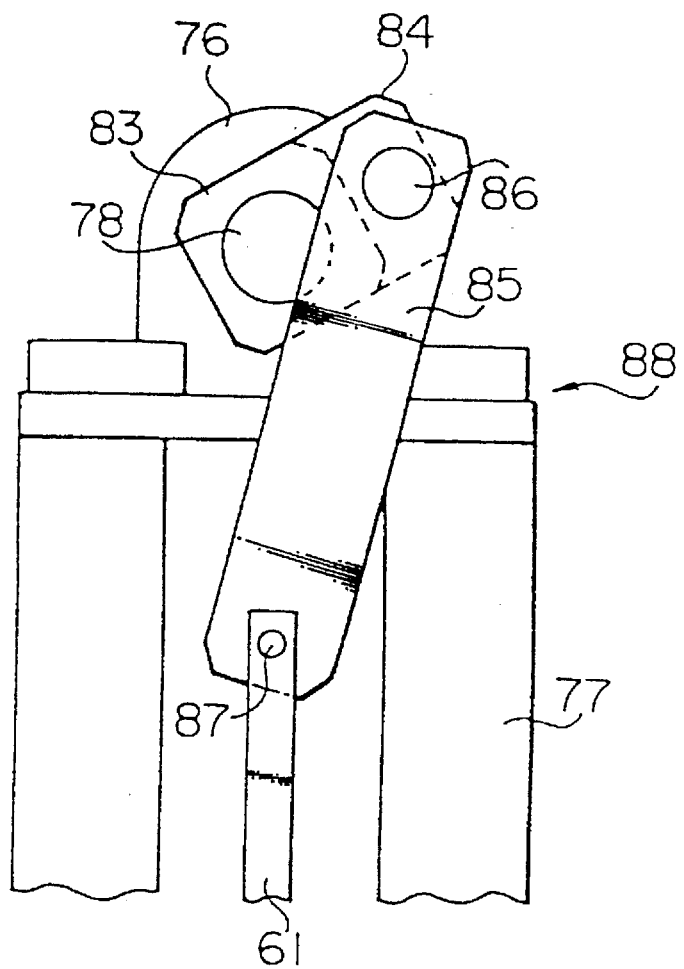

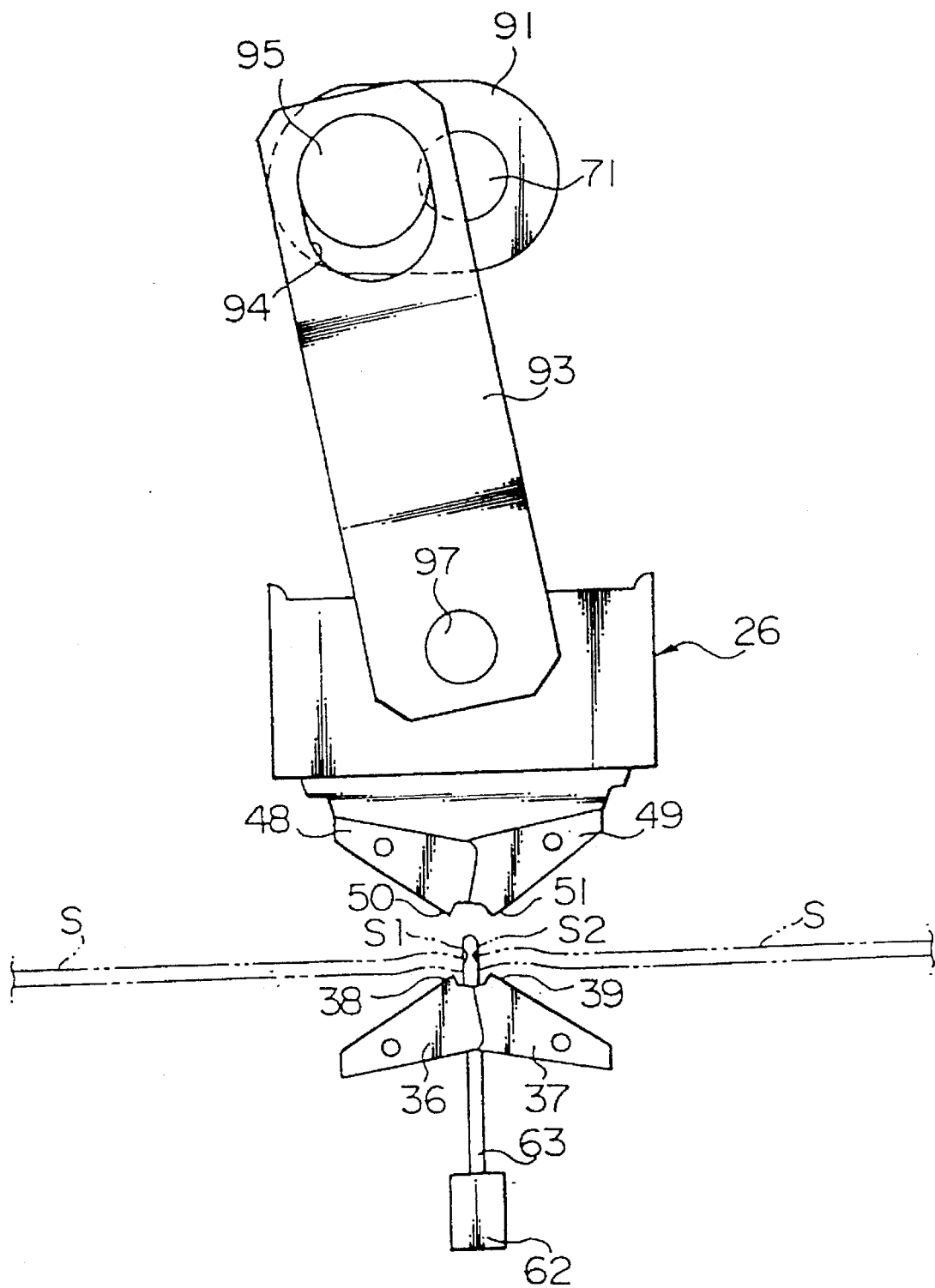
FIG_6

FIG_8

FIG_10
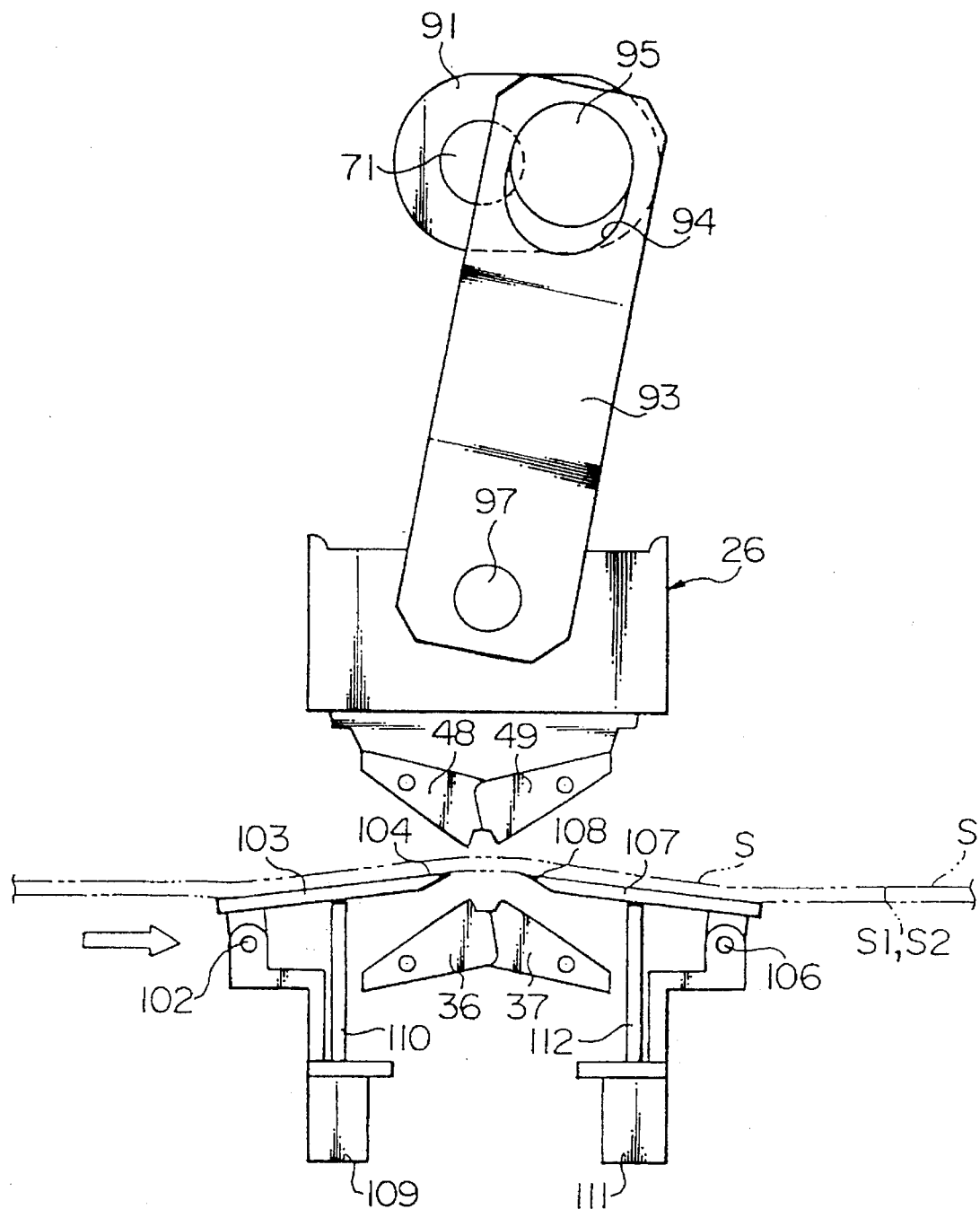

SHEET MATERIAL BUTT-JOINING APPARATUS

BACKGROUND OF THE INVENTION

1. Field of the Invention

The present invention relates to an apparatus for butt-joining starting and finishing ends of a sheet material with each other by drawing the both ends toward each other.

2. Description of the Related Art

Such a sheet material butt-joining apparatus is disclosed, for example, in Japanese Patent Examined Publication No. 55-14739. The apparatus disclosed in this publication comprises a stationary first base and a movable second base arranged above the first base and adapted to be moved vertically. A pair of bottom joining pawls extend along the starting and finishing ends of the sheet material and include bottom ends which are swingably supported by a top portion of the first base, and top ends provided with bottom joining sections which can be brought into contact with the starting and finishing ends of the sheet material, respectively, and which are inclined to approach to each other in an upward direction. A bottom energizing member serves to energize the bottom joining pawls in a rising direction. A pair of top joining pawls extend along the starting and finishing ends of the sheet material and include top ends which are swingably supported by a bottom portion of the second base, and bottom ends provided with top joining sections which can be brought into contact with the starting and finishing ends of the sheet material, respectively, and which are inclined so as to approach to each other in a downward direction. A top energizing member serves to energize the top joining pawls in the rising direction. A control member is provided, which can be situated at or retracted from an intermediate position between the starting and finishing ends of the sheet material, for maintaining a distance between said ends of the sheet material substantially constant at any position when the control member is situated at said intermediate position and contacted by said starting and finishing ends of the sheet material. A driving means serves to vertically move the second base by applying a vertically moving force thereto.

With such an arrangement of the known butt-joining apparatus, the starting and finishing ends of a sheet material are butt-joined with each other in the following manner. That is to say, the sheet material is first supplied to bottom joining pawls to bring the bottom of the starting end and the bottom of the finishing end into contact with the bottom joining section of one bottom joining pawl and that of the other bottom joining pawl respectively. In this instance, the starting and finishing ends of the sheet material is brought into contact with the control member which is situated at an intermediate position between these ends of the sheet material to keep the distance therebetween approximately constant at any position. Then, the control member is lowered and retracted from the intermediate position between the starting and finishing ends of the sheet material to form a gap with a predetermined width between the opposite ends of the sheet material. Then, the vertically moving means is operated to lower the second base and bring the top joining section of one top joining pawl into contact with the top of the starting end of the sheet material and the top joining section of the other top joining pawl into contact with the top of the finishing end of the sheet material, respectively. Thereby, the starting end of the sheet material is held vertically by the top and bottom joining pawls forming a pair and the finishing end of the sheet material is held by the other of the top and bottom joining pawls forming another pair. Because the second base continuously lowers even after the starting and finishing ends of the sheet material have been held, the top and bottom joining pawls are caused to move in the falling direction about the top and bottom ends, respectively, against the bottom energizing member. Thereby, the top and bottom joining sections of the top and bottom joining pawls approach to each other while holding the starting and finishing ends of the sheet material to butt-join these ends with each other. In this instance, in order to continuously lower the second base for accelerating the operation as described above, as soon as the top joining pawl contacts the starting and finishing ends of the sheet material and hold them together with the bottom joining pawl, the top and bottom joining pawls start moving in the falling direction to draw the starting and finishing ends of the sheet material to each other and urge them against the control member. Therefore, the control member arranged between the starting and finishing ends of the sheet material must be lowered and retracted from the intermediate position between the starting and finishing ends of the sheet material before they are urged against the control member, i.e., immediately before the top and bottom joining pawls hold the sheet material.

Thus, in the case of the above-mentioned known sheet material butt-joining apparatus, because the control member must be retracted from the intermediate position between the starting and finishing ends of a sheet material immediately before the top and bottom joining pawls contact the sheet material, the starting and finishing ends of the sheet material are not controlled until the top and bottom joining pawls hold the sheet material after the control member has been retracted. As a result, the starting and finishing ends of the sheet material are deformed and the distance between the starting and finishing ends changes depending on the position, and there may occur a problem that the joining strength and joining accuracy tend to fluctuate.

SUMMARY OF THE INVENTION

It is therefore an object of the present invention to provide a sheet material butt-joining apparatus which makes it possible to improve the joining strength and joining accuracy between the starting and finishing ends of a sheet material by keeping the distance between the starting and finishing ends of the sheet material at a specified value by a control member.

To this end, according to the present invention, there is provided a butt-joining apparatus for joining starting and finishing ends of a sheet material with each other, comprising: a stationary first base; a movable second base arranged above the first base and adapted to be moved vertically; a pair of bottom joining pawls extending along the starting and finishing ends of a sheet material and including bottom ends which are swingably supported by a top portion of the first base, and top ends provided with bottom joining sections which can be brought into contact with the starting and finishing ends of the sheet material, respectively, and which are inclined so as to approach to each other in an upward direction; a bottom energizing member for energizing said bottom joining pawls in a rising direction; a pair of top joining pawls extending along the starting and finishing ends of the sheet material and including top ends which are swingably supported by a bottom portion of the second base, and bottom ends provided with top joining sections which can be brought into contact with said starting and finishing ends of the sheet material, respectively, and which are inclined so as to approach to each other in a downward direction; a top energizing member for energizing said top joining pawls in the rising direction; a control member which can be situated at or retracted from an intermediate position between the starting and finishing ends of the sheet material, for maintaining a distance between said ends of the sheet material substantially constant at any position when the control member is situated at said intermediate position and contacted by said starting and finishing ends of the sheet material; and driving means for vertically moving the second base by applying a vertically moving force thereto; wherein said starting and finishing ends of the sheet material are butt-joined by lowering the second base by the vertically moving means and bringing the top joining sections of the top joining pawls into contact with a top of the starting and finishing ends of the sheet material, respectively, when the bottom joining sections of the bottom joining pawls contact the bottom of the starting and finishing ends of the sheet material to thereby hold the starting end of the sheet material by one of the pairs of the top and bottom joining pawls and the finishing end of the sheet material by the other of the pairs of the top and bottom joining pawls, and continuously lowering the second base even after holding the starting and finishing ends of the sheet material to swing the top and bottom joining pawls in a falling direction against the top and bottom energizing members, thereby causing the top and bottom joining sections of the top and bottom joining pawls to approach to each other while holding the starting and finishing end of the sheet material; wherein said apparatus further comprises an intermittent transfer mechanism provided in the middle of the vertically moving means, for temporarily stopping the transfer of a vertically moving force to the second base, when the top joining sections of the top joining pawls contact the top of the starting and finishing ends of the sheet material and the control member is moved toward or retracted from the intermediate position between the starting and finishing ends of the sheet material while the transfer of the vertically moving force to the second base is stopped.

With the above-mentioned arrangement of the apparatus according to the present invention, for butt-joining the starting and finishing ends of a sheet material with each other, the sheet material is first supplied to the bottom joining pawls to bring the bottom of the starting end and the bottom of the finishing end into contact with the bottom joining section of one bottom joining pawl and that of the other bottom joining pawl, respectively. In this instance, the starting and finishing ends of the sheet material are brought into contact with the control member which is situated at an intermediate position between the starting and finishing ends of the sheet material with a predetermined force to keep the distance between these ends approximately constant at any position. Then, the vertically moving means is operated to lower the second base to thereby bring the top joining section of one of top joining pawls into contact with the top of the starting end of the sheet material and the top joining section of the other top joining pawl into contact with the top of the finishing end of the sheet material, respectively. Thereby, the starting end of the sheet material is held from top and bottom by the top and bottom joining pawls forming a pair and the finishing end of the sheet material is held from top and bottom by the top and bottom joining pawls forming another. On such occasion, although the vertically moving means continuously operates even after holding the starting and finishing ends of the sheet material, the intermittent transfer mechanism temporarily stops the transfer of vertically moving force to the vertically moving base. Therefore, the vertically movable second base and the top joining pawl become as if they were left on the sheet material. As a result, the top joining pawl is brought into contact with the starting and finishing ends of the sheet material due to the weight of the second base and that of the top joining pawl. Therefore, the starting and finishing ends of the sheet material are not drawn to each other but maintained in a state wherein the starting and finishing ends contact the control member with a predetermined force. While the transfer of the vertically moving force to the second base is stopped, the control member is retracted from the intermediate position to form a gap between the starting and finishing ends of the sheet material. In this instance, however, because the starting and finishing ends of the sheet material are not drawn to each other as described above, the control member can be easily retracted without excessive friction. Moreover, when the control member is retracted from the intermediate position between the starting and finishing ends of the sheet material, the starting and finals of the sheet material may be deformed because they are not controlled. However, such deformation can be positively prevented because the second base and the top joining pawl urge the starting and finishing ends of the sheet material against the bottom joining pawl. When the control member is retracted from the intermediate position between the starting and finishing ends of the sheet material, the vertically moving force is transferred to the intermittent transfer mechanism once again, to lower the second base. Thereby, the top and bottom joining pawls swing about the top and bottom ends, respectively, in the falling direction against the top and bottom energizing members. As a result, the top and bottom joining sections of the top and bottom joining pawls approach each other while holding the starting and finishing ends of the sheet material to butt-join these ends with each other. In this way, the distance between the starting and finishing ends of the sheet material is kept at a specified value by the control member even after the control member has been retracted, so that the starting and finishing ends of the sheet material can be satisfactorily joined with each other to provide improved joining strength and joining accuracy.

The intermittent transfer mechanism may comprise a vertical slot and a connecting body which is inserted into the slot and vertically movable so that the transfer of the vertically moving force is stopped when the connecting body moves through the slot. In this instance, it becomes possible to reliably perform the above operation without complicated timing adjustment in spite of a simple constitution.

The pairs of the top and bottom joining pawls may comprise a plurality of top and bottom pawl segments, respectively, which are separated from each other in a longitudinal direction and individually supplied with energizing force from the top and bottom energizing members. Such an arrangement serves to improve the machining accuracy because the energizing force from the top and bottom energizing members is applied to a sheet material only through a pawl segment in contact with the sheet material, and the joining stress at the starting and finishing ends of the sheet material is kept constant independently of the width of the sheet material in addition to the possibility of downsizing each part of the apparatus.

The top and bottom joining pawls may have at least partly smooth joining surfaces. This makes it possible to prevent rubber from being partly removed from the starting and finishing ends of a sheet material or cords at these ends of the sheet material from being disarranged, without decreasing the joining strength between the starting and finishing ends of the sheet material because the top and bottom joining sections of top and bottom joining pawls properly slide on the surfaces of the starting and finishing ends of the sheet material when the top and bottom joining pawls continuously swing in the falling direction after the starting and finishing ends of the sheet material have been joined with each other.

The apparatus according to the present invention may further comprise guiding members having vertically movable sections on both sides of the bottom joining pawls, wherein the vertically movable sections are situated at a lower limit below the joining sections of the bottom joining pawls when joining the starting and finishing ends of the sheet material with each other, and wherein the vertically movable sections are raised to an upper limit above the joining sections of the bottom joining pawls when joining of the starting and finishing ends of the sheet material with each other is completed to guide the joined sheet material while raising it up to a position above the joining sections of the bottom joining pawls. Such an arrangement makes it possible to raise a joined sheet material and remove it from a bottom joining pawl after the joining operation has been completed, and to further prevent the sheet material from directly contacting a bottom joining pawl during transfer of the sheet material.

BRIEF DESCRIPTION OF THE DRAWINGS

The present invention will now be described in further detail hereinafter, with reference to a preferred embodiment shown in the accompanying drawings, wherein:

FIG. 3 is a partial front view of a bottom joining pawl;

FIG. 4 is a perspective view of top and bottom pawl segments;

FIG. 5 is a sectional view taken along the line 5—5 of FIG. 1; and

FIGS. 6 to 10 are explanatory views illustrating the function of the embodiment shown in FIG. 1.

DESCRIPTION OF THE PREFERRED EMBODIMENTS

Figure 1:
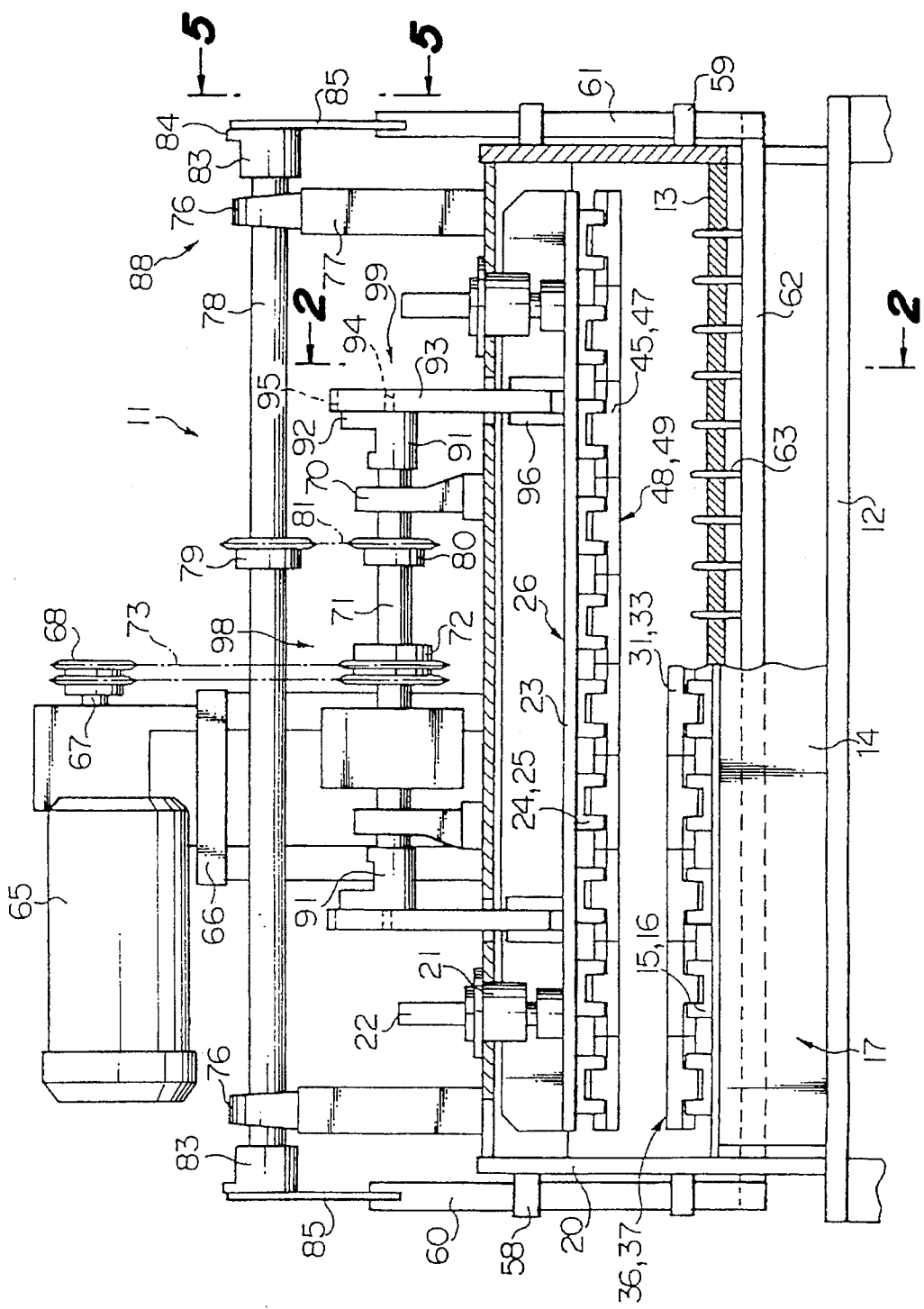
FIG. 1 is a partly broken front view showing an embodiment of the present invention.
Figure 2:
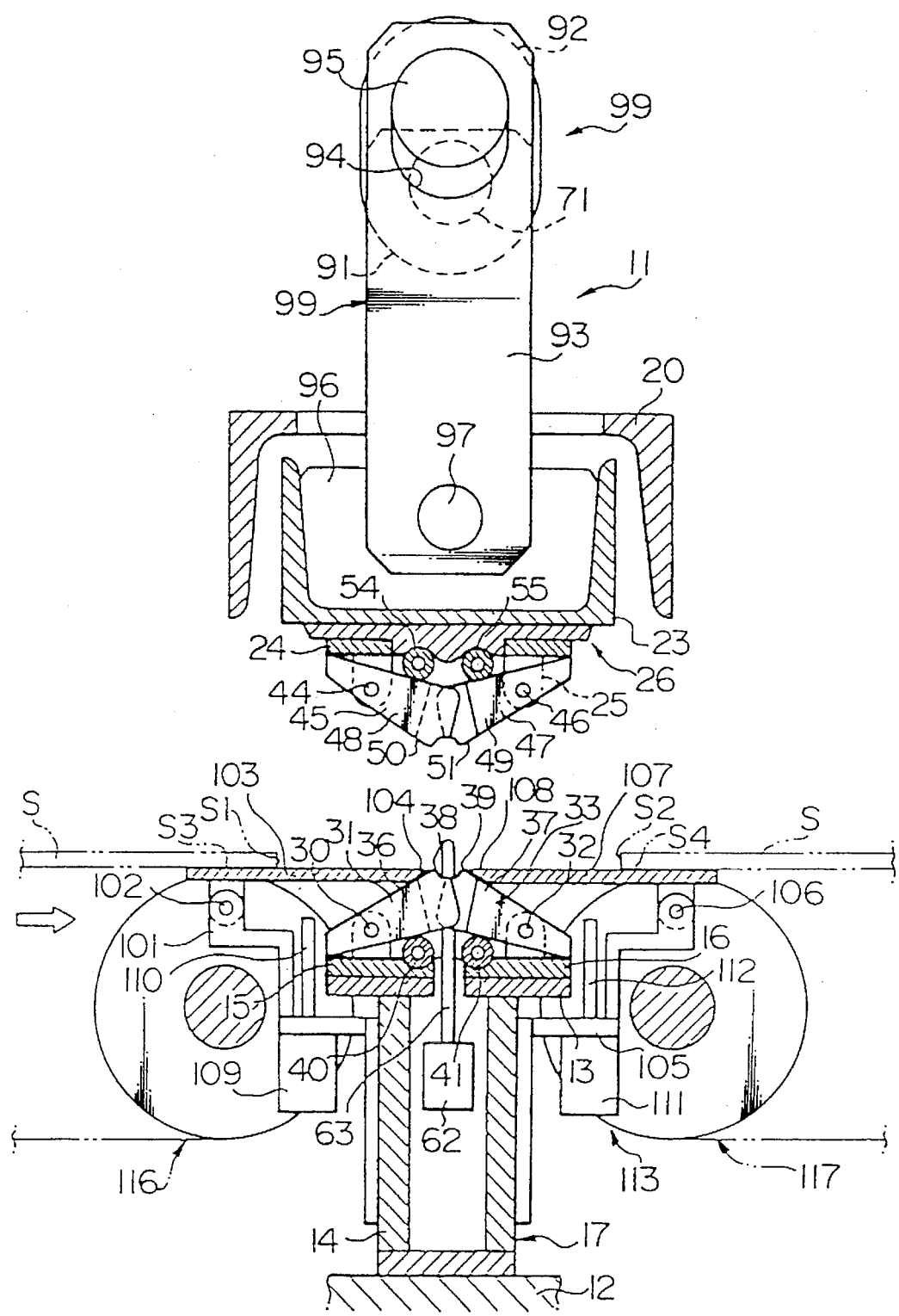
FIG. 2 is a sectional view taken along the line 2—2 of FIG. 1.

Referring now to FIGS. 1, 2, and 3, reference numeral 11 denotes an apparatus according to one embodiment of the present invention, for butt-joining starting and finishing ends S1 and S2 of a sheet material S which is cut into a predetermined length and which includes a plurality of cords. The starting end S1 and the finishing end S2 of the sheet material S extend in the same direction as the cords. The apparatus 11 has a base 12 on which a bottom support 14 is installed, having a support plate whose top end is horizontal. The bottom support 14 extends along the starting and finishing ends S1 and S2 of the sheet material S and is longer than the starting and finishing ends S1 and S2. A plurality of brackets 15 are secured to the rear top of the support plate 13 at equal intervals in the longitudinal direction of the bottom support 14. Similarly, a plurality of brackets 16 are secured to the front top of the support plate 13 at equal intervals in the longitudinal direction of the bottom support 14. The bottom support 14 and the brackets 15, 16 constitute a fixed or stationary base 17 as a whole.

Reference numeral 20 denotes a fixed frame secured onto the base 12. A pair of guide blocks 21 are installed at the top end of the fixed frame 20 and these guide block 21 are arranged just above the bottom support 14 separated by a predetermined distance in the longitudinal direction of the bottom support 14. A vertical guide rod 22 is inserted vertically movably into each guide block 21, and a mounting beam 23 parallel to the support plate 13 is located just above the support plate 13 and connected to the bottom of these guide rods 22. A plurality of brackets 24 are secured to the rear bottom of the mounting beam 23 at equal intervals in the longitudinal direction of the mounting beam 23. Similarly, a plurality of brackets 25 are secured to the front bottom of the mounting beam 23 at equal intervals in the longitudinal direction of the mounting beam 23. The mounting beam 23 and the brackets 24, 25 constitute as a whole a vertically movable base 26 (second base) provided just above the fixed base 17.

As shown in FIGS. 1, 2, and 3, the bottom ends of bottom pawl segments 31 are connected to the brackets 15 of the fixed base 17 through pins 30 respectively parallel with the support plate 13 and the bottom pawl segments 31 are adapted to vertically move individually about the pin 30. The bottom pawl segments 31 are tilted upward toward the front side. Meanwhile, the bottom ends of bottom pawl segments 33 are connected to the brackets 16 through pins 32 respectively parallel with the support plate 13 and these bottom segments 33 are adapted to vertically move individually about the pin 32. The bottom pawl segments 33 are tilted upward toward the rear side. A plurality of vertically-extending slits 34 are formed at the top ends of the bottom pawl segments 31 and 33 and these slits 34 are arranged at equal intervals in the longitudinal direction. As a result, a plurality of pawl sections 35 separated in the longitudinal direction are formed on the bottom pawl segments 31 and 33 between slits 34. Pawl sections 35 of these bottom pawl segments 31 and 33 are inserted into the slit 34 of the bottom pawl segments 33 and 31, respectively, and thereby the top ends of the bottom pawl segments 31 and 33 are engaged with each other. The bottom ends of the bottom pawl segments 31 and 33 separated in the longitudinal direction are as a whole movably supported by the top of the fixed base 17 and tilted to approach to each other in the direction upward to constitute a pair of bottom joining pawls 36 and 37 extending along the starting and finishing ends S1 and S2 of the sheet materials. The bottom joining pawls 36 and 37 have at their top ends, bottom joining sections 38 and 39 capable of contacting the bottom of the starting and finishing ends S3 and S4 of the sheet material S, respectively, and at least a part of the surfaces of the bottom joining sections 38 and 39 though the entire surface in this case is a smooth surface. Reference numeral 40 denotes a rubber tube serving as a bottom energizing member set between the top ends of all bottom pawl segments 31 and the support plate 13 and extending in the longitudinal direction of the support plate 13. Similarly, reference numeral 41 denotes a rubber tube serving as a bottom energizing member set between the top ends of all bottom pawl segments 32 and the support plate 13 and extending in the longitudinal direction of the support plate 13. Air at a predetermined pressure is supplied into the rubber tubes 40 and 41. Therefore, the rubber tubes 40 and 41 are able to apply an energizing force toward the rising direction to the bottom pawl segments 31 and 33 individually.

The top ends of top pawl segments 45 are connected to the brackets 24 of the vertically movable base 26 through pins 44 respectively parallel with the mounting beam 23, and the top pawl segments 45 are adapted to vertically swing about the pin 44 individually. The top pawl segments 45 are tilted downward toward the front side. Also, the top ends of top pawl segments 47 are connected to the brackets 25 through pins 46 respectively parallel with the mounting beam 23, and these top pawl segments 47 are adapted to vertically swing about the pin 46 individually. The top pawl segments 47 are tilted downward toward the rear side. A plurality of vertically-extending slits 34 and pawl sections 35 are formed on the bottom ends of the top pawl segments 45 and 47 similarly to the bottom pawl segments 31 and 33 described above, and the bottom ends of the top pawl segments 45 and 47 are engaged with each other because the pawl sections 35 of the top segments 5 and 47 are inserted into the slits 34 of the top segments 47 and 45, respectively.

The top ends of the top segments 45 and 47 separated in the longitudinal direction are swingably supported by the bottom of the vertically movable base 26 and tilted to approach to each other in the downward direction to constitute a pair of top joining pawls 48 and 49 extending along the starting and finishing ends S1 and S2 of the sheet material S. The top joining pawls 48 and 49 have top joining sections 50 and 51 capable of contacting the top of the starting and finishing ends S3 and S4 of the sheet material S, respectively, and at least a part of the surfaces of the top joining sections 50 and 51 (the entire surface in the illustrated embodiment) is smooth and flat without unevenness. At least a part of the surfaces of the top joining sections 38, 39, 50, and 51 is formed into a smooth and flat face so that the top joining sections 38, 39, 50, and 51 are properly slidable on the starting and finishing ends S3 and S4 of the sheet material S, as will be explained hereinafter. Reference numeral 54 denotes a rubber tube serving as a top energizing member set between the bottom ends of all top pawl segments 45 and the mounting beam 23 and extending in the longitudinal direction of the mounting beam 23. Similarly, reference numeral 55 denotes a rubber tube serving as a top energizing member set between the bottom ends of all top pawl segments 47 and the mounting beam 23 and extending in the longitudinal direction of the mounting beam 23. Air at a predetermined pressure is supplied into these rubber tube 54 and 55. Therefore, these rubber tubes 54 and 55 are able to apply an energizing force toward the rising direction to the top pawl segments 45 and 47.

Referring to FIGS. 1 and 2, a plurality of guide blocks 58 and 59 vertically separated from each other are installed at the right and left ends of the fixed frame 20, and vertically-extending slide bars 60 and 61 are inserted vertically movable into the guide blocks 58 and 59. Both ends of a mounting bar 62 located just under the support plate 13 and extending along the support plate 13 are connected to the bottom ends of these slide bars 60 and 61, respectively. A plurality of control pins 63 passing through the support plate 13 and vertically extending as control members are installed at the top center of the mounting bar 62. The control pins 63 are arranged at equal intervals in the longitudinal direction of the mounting bar 62. The top ends of these control pins 63 are situated at an intermediate position between the starting and finishing ends S1 and S2 of the sheet material S, when the mounting bar 62 rises or retracts downward from the intermediate position between the starting and finishing ends S1 and S2 of the sheet material S when the mounting bar 62 lowers. Moreover, when the starting and finishing ends S1 and S2 of the sheet material S contact the control pins 63 while the control pins 63 are situated at the intermediate position between the starting and finishing ends S1 and S2 of the sheet material S, the distance between the starting and finishing ends S1 and S2 of the sheet material S is kept approximately constant and these starting and finishing ends S1 and S2 become almost parallel.

In FIGS. 1 and 5, reference numeral 65 denotes a motor mounted on a table 66 set on the fixed frame 20. A sprocket 68 is secured to the output axis 67 of the motor 65. Reference numeral 70 denotes a pair of bearings secured to the fixed frame 20 and separated in the longitudinal direction of the mounting beam 23 just above the mounting beam 23. A rotational shaft 71 parallel with the mounting beam 23 is rotatably supported by these bearings 70. Reference numeral 72 denotes a sprocket secured to the rotational shaft 71. A chain is applied between the sprockets 72 and 68 and thereby the rotational shaft 71 is rotated through the chain 73 when the motor 65 operates. A bearing stand 77 fitted with bearings at its top is secured to the right and left ends of the fixed frame 20 and a rotational shaft 78 parallel with the rotational shaft 71 is rotatably supported by these bearings 76. Reference numeral 79 denotes a sprocket secured to the rotational shaft 78. A chain 81 is applied between the sprocket 79 and the sprocket 80 secured to the rotational shaft 71 and thereby the rotation of the rotational shaft 71 is transferred to the rotational shaft 78 through the chain 81. A transfer block 83 is set to both ends of the rotational shaft 78, respectively, and each of these transfer blocks 83 has a protrusion 84 extending radially outward. Reference numeral 85 denotes a pair of vertically-extending transfer links, and a cam follower 86 supported by the protrusion 84 is inserted into the top ends of these transfer links 85. As a result, the transfer links 85 are connected to the rotational shaft 78 at a position deviated from the axis of the rotational shaft 78. Moreover, the bottom ends of the transfer links 85 are connected to the top ends of the slide bars 60 and 61 through a pin 87. Therefore, when the rotational shaft 78 rotates, the torque is converted into a vertical motion by the transfer link 85 and transferred to the slide bars 60 and 61. The motor 65, sprockets 68, 72, 80, and 81, chains 73 and 81, rotational shafts 71 and 78, transfer block 83, transfer link 85, and slide bars 60 and 61 constitute emerging/retracting means 88 for emerging or retracting the control pin 63 at the intermediate position between the starting and finishing ends S1 and S2 of the sheet material S.

Referring to FIGS. 1 and 2, transfer blocks 91 are set to both ends of the rotational shaft 71, respectively, and each of the transfer blocks 91 has a protrusion 92 extending radially outward. Reference numeral 93 denotes a pair of vertically-extending transfer links, and a vertically-extending slot 94 is formed on the top ends of the transfer links 93 respectively. A cam follower 95 serving as a connecting body and rotatably supported by the protrusion 92 of the transfer block 91 is inserted into the slots 94 of the transfer links 93. Thus, transfer links 93 are connected to the rotational shaft 71 at a position deviated from the axis of the rotational shaft 71. Moreover, the cam follower 95 moves vertically in the slot 94 while it is inserted. The bottom end of the transfer link 93 is connected to a bracket 96 secured to the beam 23 through a pin 97. Therefore, when the rotational shaft 71 rotates, the torque is converted into a vertically moving force by the transfer block 91 and the transfer link 93, and transferred to the beam 23. However, the vertically moving force is temporarily interrupted between the cam follower 95 and the slot 94 only when the cam follower 95 moves in the slot 94. The motor 65, sprockets 68 and 72, chain 73, rotational shaft 71, transfer block 91, transfer link 93, and bracket 96 as a whole constitute vertically moving means 98 for vertically moving the second base 26 by giving a vertically moving force thereto. Therefore, the vertically moving means 98 shares with the emerging/retracting means 88, the motor 65, sprockets 68 and 72, chain 73, and rotational shaft 71. As a result, the structure is simplified as a whole. Moreover, because the same driving source, that is the driving force of the motor 65 is used by the emerging/retracting means 88 and the vertically moving means 98, it is possible to accurately set the timing for joining and the timing for emerging/retracting the control pin 63 even at a high-speed operation. Moreover, the slot 94 and an intermittent transfer mechanism 99 comprising the cam follower 95 capable of moving in the slot 94 are provided in the middle of the vertically moving means 98, the intermittent transfer mechanism 99 is able to temporarily stop the transfer of the vertically moving force from the vertically moving means 98 to the second base 26.

A bracket 101 is secured to the back of the bottom support 14 and the rear end of a guiding member 103 extending in the longitudinal direction is rotatably connected to the top of the bracket 101 through a pin 102. The guiding member 103 extends forward up to the vicinity of the bottom joining section 38 of the bottom joining pawl 36, and has a vertically moving section 104 at its front end. Meanwhile, a bracket 105 is secured to the front of the bottom support 14 and the front end of a guiding member 107 extending in the longitudinal direction is rotatably connected to the top of the bracket 105 through a pin 106. Moreover, the guiding member 107 extends backward up to the vicinity of the bottom joining section 39 of the bottom joining pawl 37, and has a vertically moving section 108 at its rear end. Reference numeral 109 denotes a vertically-extending cylinder set to the bracket 101 before the pin 102, that is, at the side close to the bottom joining pawl 36. A piston rod 110 of the cylinder 109 is located just under the central portion of the guiding member 103. When the piston rod 110 of the cylinder 109 is retracted, the guiding member 103 swings in the falling direction due to its own weight until it becomes almost horizontal. In this case, the vertically moving section 104 reaches the lowering limit and is located at a position lower than the bottom joining section 38 of the bottom joining pawl 36. Reference numeral 111 denotes a vertically-extending cylinder set to the bracket 105 to the rear of the pin 106, that is, at the side close to the bottom joining pawl 37. A piston rod 112 of the cylinder 111 is located just under the central portion of the guiding member 107. When the piston rod 112 of the cylinder 111 is retracted, the guiding member 107 swings in the falling direction due to its own weight until it becomes almost horizontal. In this case, the vertically moving section 108 reaches its lowering limit and is located at a position lower than the bottom joining section 39 of the bottom joining pawl 37. When the piston rods 110 and 112 of the guiding member 109 and 111 are protruded, the guiding members 103 and 107 are pushed from the bottom by the piston rods 110 and 112 and swing in the rising direction. Thereby, the vertically moving sections 104 and 108 rise up to the rising limit upper than the bottom joining sections 38 and 39 of the bottom joining pawls 36 and 37. The cylinders 109 and 111 constitute as a whole a vertically moving mechanism 113 for raising the vertically moving sections 104 and 108 by swinging the guiding members 103 and 107. Reference numerals 116 and 117 denote belt conveyers provided before and behind the fixed base 17. These belt conveyers 116 and 117 synchronously travel to transfer the sheet material S forward. The top of belt conveyers 116 and 117 is located at almost the same height as the top of the horizontal guiding members 103 and 107.

The operation of the above-described butt-joining apparatus according to the present invention will be described below.

As shown in FIG. 2, it is assumed that the starting end S1 of the sheet material S located at the rear side is mounted on the belt conveyer 116 slightly separately from the bottom joining pawl 36 backward, the finishing end S2 of the sheet material S located at the front side is mounted on the belt conveyer 117 slightly separately from the bottom joining pawl 37 forward, and the control pin 63 is emerging between the starting and finishing ends S1 and S2 of these sheet materials S. In this case, the vertically movable second base 26 waits at the rising limit and the guiding members 103 and 107 are stopped under the state in which the vertically moving sections 104 and 108 are located at the rising limit.

Next, when driving the belt conveyer 116 to travel forward and the belt conveyer 117 to travel backward, the mounted sheet materials S are transferred toward the control pin 63 while being guided by the guiding members 103 and 107. When the starting and finishing ends S1 and S2 of sheet materials S contact the control pin 63 with a predetermined force, the traveling of belt conveyers 116 and 117 is stopped. In this case, because the control pin 63 with the same diameter is present between the starting and finishing ends S1 and S2 of the sheet materials S, the distance between S1 and S2 is kept approximately constant at any position and S1 and S2 become almost parallel.

The driving force of the rotational shaft 71 rotated by the continuous operation of the motor 65 is converted into a vertically moving force by the transfer block 91 and transfer link 93 and transferred to the vertically movable second base 26. Thereby, the second base 26 starts lowering by being guided by the guide block 21 and guide rod 22. In this case, because the piston rods 110 and 112 of the cylinders 109 and 111 retract, the guiding members 103 and 107 swing in the falling direction until they become almost horizontal due to their own weight and the vertically moving sections 104 and 108 reach the lowering limit and a position lower than the bottom joining sections 38 and 39 of the bottom joining pawls 36 and 37. As a result, the starting end S3 of the sheet material S at the rear side is supplied onto the bottom joining pawl 36 and the bottom of the starting ends S3 contacts the bottom joining section 38 of the bottom joining pawl 36. Moreover, the finishing end S4 of the sheet material S at the front side is supplied onto the bottom joining pawl 37 and the bottom of the finishing end S4 contacts the bottom joining section 39 of the bottom joining pawl 37. In this case, the cam follower 95 contacts top end of the slot 94 in the longitudinal direction because the vertically movable base 26 and the top joining pawls 48 and 49 are about to lower. This state is shown in FIG. 6. Also, at this time, the rotational shaft 78 also rotates and the torque of the rotational shaft 78 is converted into a vertically moving force by the transfer block 83 and transfer link 85 and transferred to the slide bars 60 and 61 to slowly lower the mounting bar 62 and control pin 63.

Figure 7:
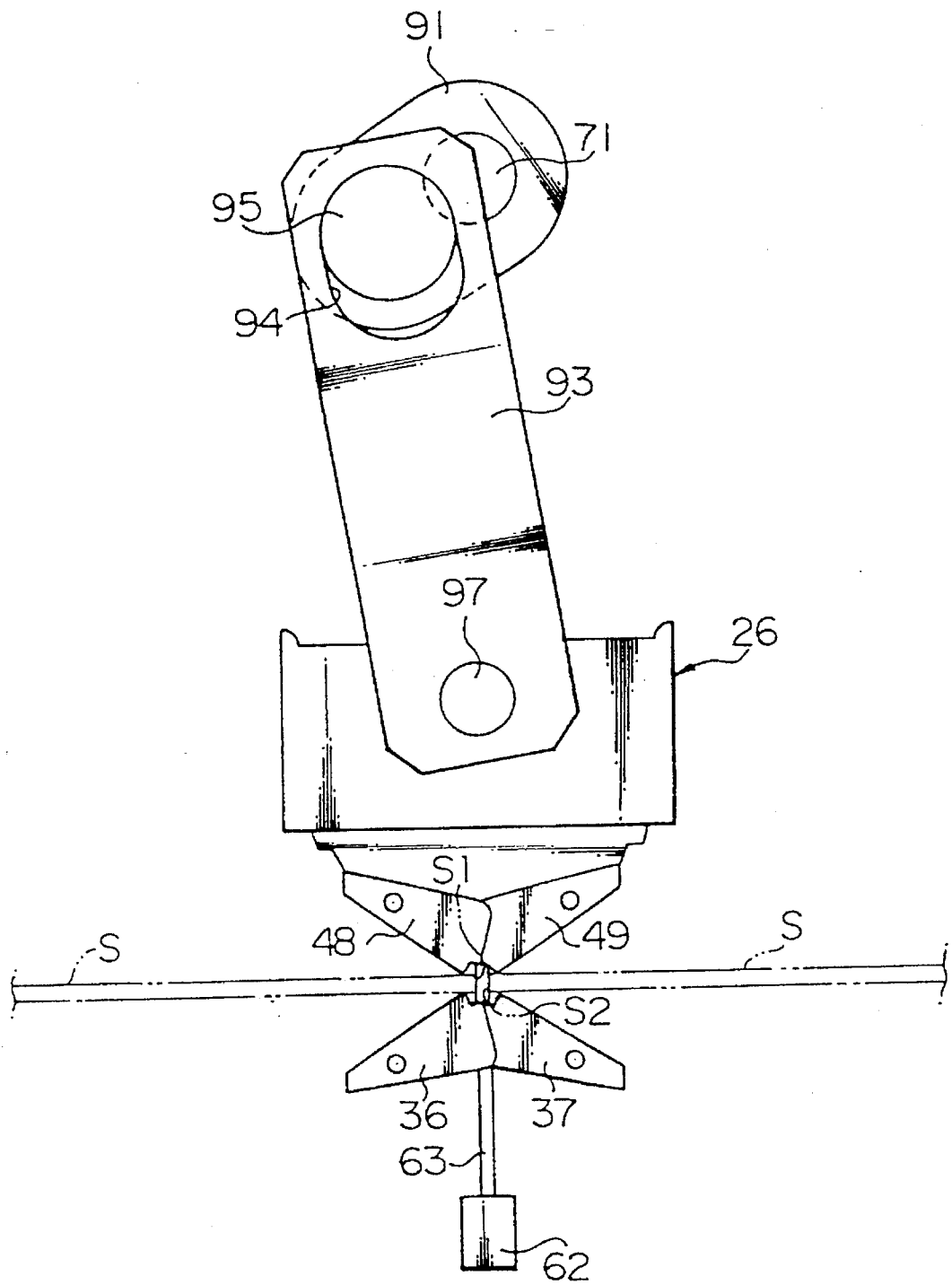

In this way, when the vertically movable base 26 lowers and the top joining section 50 of the top joining pawl 48 at the rear side contacts the top of the starting end S3 of the sheet material S at the rear side and the top joining section 51 of the top joining pawl 49 at the front side contacts the top of the finishing end S4 of the sheet material S at the front side, the top and bottom joining pawls 48 and 36 at the rear side hold from top and bottom the starting end S3 of the sheet material S at the rear side, and the top and bottom joining pawls 49 and 37 at the front side hold in the same way the finishing end S4 of the sheet material S at the front side. This state is shown in FIG. 7.

In this case, the motor 65 is continuously operated to accelerate the operation even after the starting and finishing ends S3 and S4 are held from top and bottom, to rotate the rotational shaft 71. However, the vertically movable base 26 and the top joining pawls 48 and 49 are prevented from lowering because they contact the sheet material S and the cam follower 95 can smoothly be moved in the slot 94. Therefore, the cam follower 95 starts moving toward the bottom end of the slot 94 in the longitudinal direction. When the cam follower 95 moves in the slot 94, the transfer of vertically moving force from the rotational shaft 71 to the vertically movable base 26 is temporarily interrupted between the cam follower 95 and the slot 94. As a result, the vertically movable base 26 and top joining pawls 48 and 49 are in a state of being placed on the sheet material S and the top joining pawls 48 and 49 become contacting the starting and finishing ends S3 and S4 of the sheet material S due to the weights of the vertically movable base 26 and top joining pawls 48 and 49. Thus, because the transfer of a vertically moving force to the vertically movable base 26 is interrupted while the cam follower 95 moves in the slot 94, the starting and finishing ends S1 and S2 of the sheet material S are not drawn to each other and the contacting force to the control pin 63 is kept at the predetermined force described above. By performing the temporary interruption of the vertically moving force by the slot 94 and cam follower 95, it is possible to positively interrupt the transfer of the vertically moving force without performing complicated timing adjustment though a simple structure is used. In this case, the mounting bar 62 and control pin 63 also continue to lower. However, while the cam follower 95 moves in the slot 94 and the vertically moving force is interrupted, the control pin 63 further lowers and retracts from the intermediate position between the starting and finishing ends S1 and S2 of the sheet material S to form a gap with a width equal to the diameter of the control pin 63 between the starting and finishing ends S1 and S2 of the sheet material S. At this time, the starting and finishing ends S1 and S2 of the sheet material S are not drawn to each other as described above. Therefore, the control pin 63 easily retracts from the position between the starting and finishing ends S1 and S2 without involving large friction. Also, when the control pin 63 retracts from the position between the starting and finishing ends S1 and S2 of the sheet material S, the starting and finishing ends S3 and S4 of the sheet material S may be deformed because they are not controlled. However, such deformation is positively prevented because the vertically movable base 26 and top joining pawls 48 and 49 press with their own weight the starting and finishing ends S3 and S4 of the sheet material S against the bottom joining pawls 36 and 37.

Figure 8:
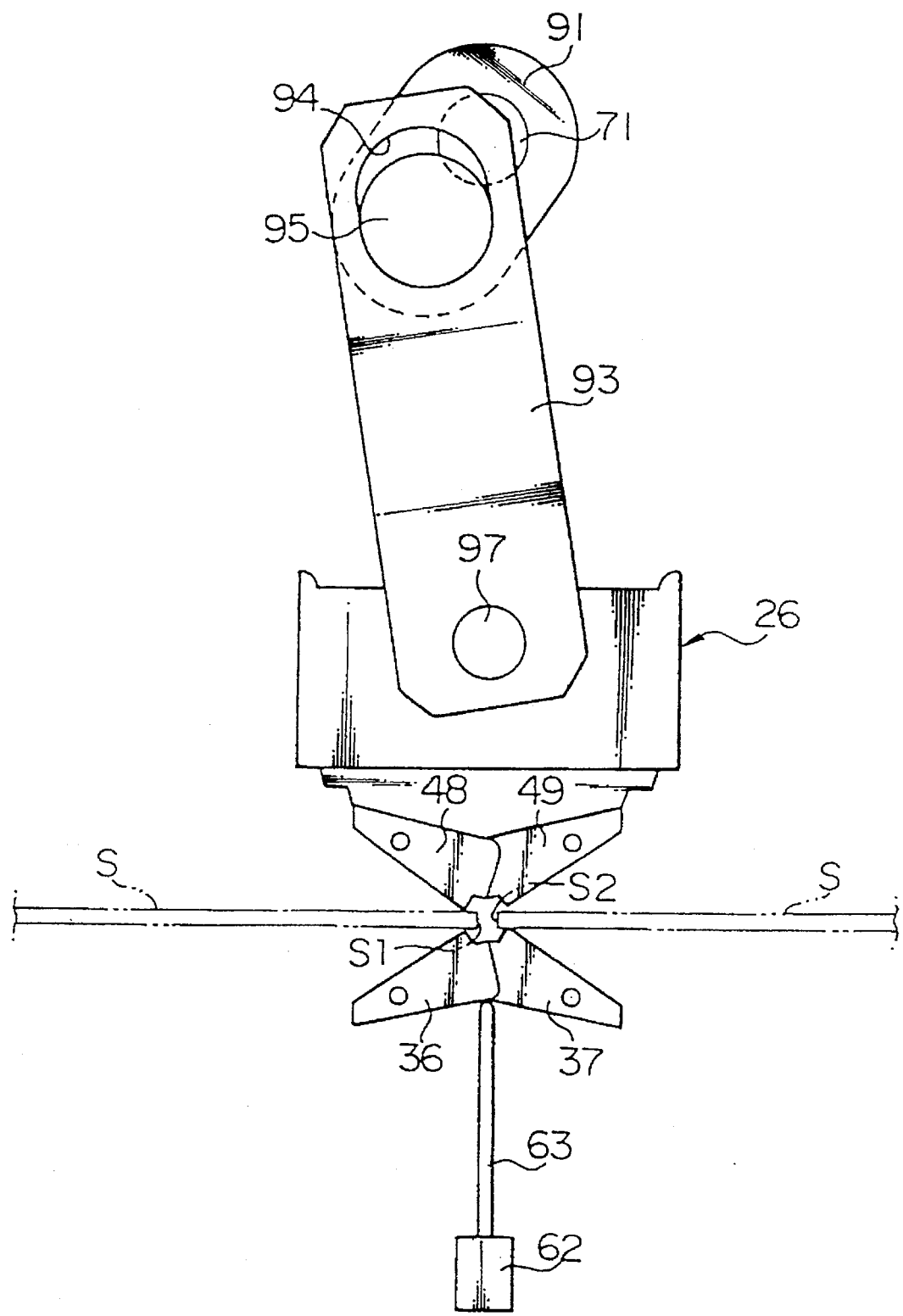

When the cam follower 95 reaches and contacts the bottom end of the slot 94 in the longitudinal direction after the control pin 63 retracts from the intermediate position between the starting and finishing ends S1 and S2 of the sheet material S as shown in FIG. 8, the transfer of vertically moving force is restarted from the rotational shaft 71 to the vertically movable base 26 so that the vertically movable base 26 further lowers. Thereby, the top joining pawls 48 and 49 and bottom joining pawls 36 and 37 swing in the falling direction about the pins 44 and 46 and the pins 30 and 32, respectively, while withstanding the air pressure in the rubber tubes 54 and 55 and that in the rubber tubes 40 and 41. In this case, the top joining pawls 48 and 49 and bottom joining pawls 36 and 37 are tilted to further approach to each other downward and upward respectively. Therefore, when they tilt in the falling direction as described above, the top joining sections 50 and 51 of the top joining pawls 48 and 49 and the bottom joining sections 38 and 39 of the bottom joining pawls 36 and 37 approach to each other while holding the starting and finishing ends S3 and S4 of the sheet material S to bring the starting and finishing ends S1 and S2 of the sheet material S into contact with each other. Moreover, because the top joining pawls 48 and 49 and the bottom joining pawls 36 and 37 tilt in the falling direction even after the starting and finishing ends S1 and S2 of the sheet material S contact with each other, the starting and finishing ends S1 and S2 of the sheet material S are strongly pressed and butt-joined with each other.

Figure 9:
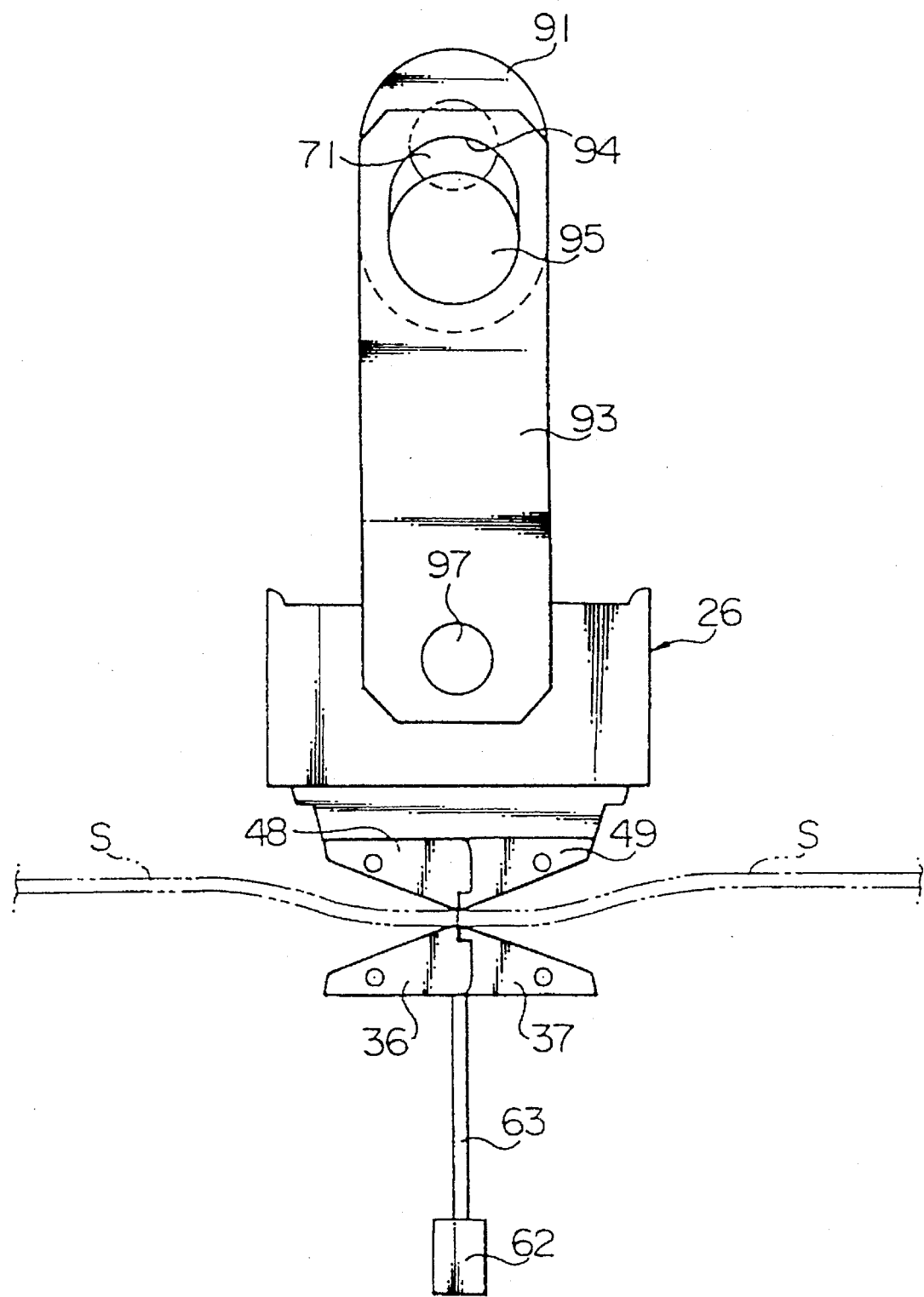

Here, at least a portion of the surfaces of the top joining sections 50 and 51 and a portion of the surfaces of the bottom joining sections 38 and 39 are shown as being flat and smooth. However, they may be constituted so that the entire surface is flat and smooth. Therefore, the top joining sections 50 and 51 and the bottom joining sections 38 and 39 properly slide on the surfaces of the starting and finishing ends S3 and S4 of the sheet material S. Thereby, it is possible to prevent rubber from being partially chipped off from the starting and finishing ends S3 and S4 of the sheet material S or cords at the starting and finishing ends S3 and S4 from being disarranged without decreasing the joining strength between the starting and finishing ends S1 and S2 of the sheet material S. Moreover, when each of the top joining pawls 48 and 49 and the bottom joining pawls 36 and 37 comprises a slender segment, the joining force for joining the starting and finishing ends S1 and S2 of the sheet material S with each other becomes a constant value obtained by multiplying the overall length (constant value) of a segment by the energizing force (constant value) for a unit length applied to the segment from the rubber tubes 54, 55, 40 and 41. Therefore, if the widths of the sheet materials S to be joined are different, the joining stress between the starting and finishing ends S1 and S2 of the sheet material S changes and thereby the joining strength and accuracy may fluctuate. In the case of this embodiment, however, the top joining pawls 48 and 49 and the bottom joining pawls 36 and 37 comprise top pawl segments 45 and 47 and bottom pawl segments 31 and 33 which are separated in the longitudinal direction respectively, and the energizing force from the rubber tubes 54, 55, 40 and 41 is applied to the top and bottom pawl segments 45, 47, 31, and 33 individually. Therefore, the energizing force from the rubber tubes 54, 55, 40, and 41 is applied to the sheet material S only through the top and bottom segments 45, 47, 31, and 33 contacting the starting and finishing ends S3 and S4 of the sheet material S. As a result, the joining stress between the starting and finishing ends S1 and S2 of the sheet material S becomes almost constant regardless of the width of the sheet material S, the joining strength and accuracy are improved, while each part can be downsized to improve the machining accuracy. Moreover, even if the control pin 63 lowers and retracts, the starting and finishing ends S1 and S2 of the sheet material S are satisfactorily joined with each other and the joining strength and accuracy between them are improved because the distance between the starting and finishing ends S1 and S2 of the sheet material S is kept at a specified value by the control pin 63. This state is shown in FIG. 9.

When the starting and finishing ends S1 and S2 of the sheet material S are joined with each other in the above manner, the vertically movable base 26 and the top joining pawls 48 and 49 are reversed by the operation of the motor 65 to start rising. Simultaneously with the start of the rising, the cylinders 109 and 111 synchronously operate and the piston rods 110 and 112 protrude. As a result, the guiding members 103 and 107 are pushed from the bottom by the piston rods 110 and 112 to swing about the pins 102 and 106 in the rising direction and the vertically moving sections 104 and 108 rise up to the rising limit upper than the bottom joining sections 38 and 39 of the bottom joining pawls 36 and 37. In this case, because the joined starting and finishing ends S3 and S4 of the sheet material S are raised by the vertically moving sections 104 and 108, the starting and finishing ends S3 and S4 are forcibly removed from the bottom joining sections 38 and 39 even if they adhere closely to the bottom joining sections 38 and 39 of the bottom joining pawls 36 and 37 and thereby the sheet material S can be transferred. Thereafter, by driving the belt conveyers 116 and 17 to synchronously travel forward, the joined sheet material S is transferred until the finishing end S2 of the sheet material S reaches slightly forward than the control pin 63 and the starting end S1 of a new sheet material S reaches slightly backward than the control pin 63. In this case, the sheet material S is raised by the guiding members 103 and 107 and passes above the bottom joining pawls 36 and 37. Therefore, the sheet material S does not directly contact the bottom joining pawls 36 and 37 and thereby the quality of the sheet material S can be improved. This state is shown in FIG. 10. Then, the vertically movable base 26 rises up to the initial position and the control pin 36 also rises up to the initial position to appear between the starting and finishing ends S1 and S2 of the sheet material S. The above-described operation is one cycle of this embodiment. By repeating the above operation, the sheet material S is butt-joined successively.

The above embodiment uses the rubber tubes 54, 55, 40 and 41 into which air at a predetermined pressure is injected as top and bottom energizing members. In the case of the present invention, however, it is possible to use a spring. Moreover, the above embodiment retracts the control pin 63 by lowering it. In the case of the present invention, however, it is also possible to retract the pin 63 by raising it.

As described above, the present invention makes it possible to improve the joining strength and joining accuracy between the starting and finishing ends of a sheet material by keeping the distance between the starting and finishing ends at a specified value by a control member.

While the present invention has been described with reference to a specific embodiment, it is of course that various modifications and/or alterations can be made without departing from the scope of the invention as defined by the appended claims.

I claim:

1. A butt-joining apparatus for joining starting and finishing ends of a sheet material with each other, comprising: a stationary first base; a movable second base arranged above the first base and adapted to be moved vertically; a pair of bottom joining pawls extending along the starting and finishing ends of a sheet material and including bottom ends which are swingably supported by a top portion of the first base, and top ends provided with bottom joining sections which can be brought into contact with the starting and finishing ends of the sheet material, respectively, and which are inclined so as to approach to each other in an upward direction; a bottom energizing member for energizing said bottom joining pawls in a rising direction; a pair of top joining pawls extending along the starting and finishing ends of the sheet material and including top ends which are swingably supported by a bottom portion of the second base, and bottom ends provided with top joining sections which can be brought into contact with said starting and finishing ends of the sheet material, respectively, and which are inclined so as to approach to each other in a downward direction; a top energizing member for energizing said top joining pawls in the rising direction; a control member which can be situated at or retracted from an intermediate position between the starting and finishing ends of the sheet material, for maintaining a distance between said ends of the sheet material substantially constant at any position when the control member is situated at said intermediate position and contacted by said starting and finishing ends of the sheet material; and vertically moving means for vertically moving the second base by applying a vertically moving force thereto; wherein said starting and finishing ends of the sheet material are butt-joined by lowering the second base by the vertically moving means and bringing the top joining sections of the top joining pawls into contact with a top of the starting and finishing ends of the sheet material, respectively, when the bottom joining sections of the bottom joining pawls contact the bottom of the starting and finishing ends of the sheet material to thereby hold the starting end of the sheet material by one of the pairs of the top and bottom joining pawls and the finishing end of the sheet material by the other of the pairs of the top and bottom joining pawls, and continuously lowering the second base even after holding the starting and finishing ends of the sheet material to swing the top and bottom joining pawls in a falling direction against the top and bottom energizing members, thereby causing the top and bottom joining sections of the top and bottom joining pawls to approach to each other while holding the starting and finishing end of the sheet material; wherein said apparatus further comprises an intermittent transfer mechanism provided in the middle of the vertically moving means, for temporarily stopping the transfer of a vertically moving force to the second base while the vertically moving means continuously operates, when the top joining sections of the top joining pawls contact the top of the starting and finishing ends of the sheet material and the control member is moved toward or retracted from the intermediate position between the starting and finishing ends of the sheet material while the transfer of the vertically moving force to the second base is stopped.

2. The apparatus according to claim 1, wherein the intermittent transfer mechanism comprises a vertical slot and a connecting body which is inserted into the slot and vertically movable so that the transfer of the vertically moving force is stopped when the connecting body moves through the slot.

3. The apparatus according to claim 1, wherein the pairs of the top and bottom joining pawls comprise a plurality of top and bottom pawl segments, respectively, which are separated from each other in a longitudinal direction and individually supplied with energizing force from the top and bottom energizing members.

4. The apparatus according to claim 1, wherein the top and bottom joining pawls have at least partly smooth joining surfaces.

5. The apparatus according to claim 1, wherein the apparatus further comprises guiding members having vertically movable sections on both sides of the bottom joining pawls, said vertically movable sections being situated at a lower limit below the joining sections of the bottom joining pawls when joining the starting and finishing ends of the sheet material with each other, and said vertically movable sections being raised to an upper limit above the joining sections of the bottom joining pawls when joining of the starting and finishing ends of the sheet material with each other is completed so as to guide the joined sheet material while raising it up to a position above the joining sections of the bottom joining pawls.

* * * * *